(12) United States Patent
Fryer et al.

(10) Patent No.: US 7,099,517 B2
(45) Date of Patent: Aug. 29, 2006

(54) CODEBOOK SEARCH METHODS

(75) Inventors: Richard John Fryer, Torrance (GB); Robert Bartholemew Lambert, Bridge of Weir (GB); David James Breslin, Cambuslang (GB); Paul Edward George Devlin, Kelvinbridge Glasgow (GB)

(73) Assignee: University of Strathclyde, Glasgow (GB)

( * ) Notice: Subject to any disclaimer, the term of this patent is extended or adjusted under 35 U.S.C. 154(b) by 724 days.

(21) Appl. No.: 10/182,299

(22) PCT Filed: Jan. 31, 2001

(86) PCT No.: PCT/GB01/00394

§ 371 (c)(1),
(2), (4) Date: Sep. 23, 2002

(87) PCT Pub. No.: WO01/58168

PCT Pub. Date: Aug. 9, 2001

(65) Prior Publication Data

US 2003/0138159 A1    Jul. 24, 2003

(30) Foreign Application Priority Data

Feb. 5, 2000    (GB) ................................. 0002623.7

(51) Int. Cl.
*G06K 9/36* (2006.01)
*G06K 9/46* (2006.01)

(52) U.S. Cl. ...................................... 382/253; 382/250

(58) Field of Classification Search ................ 382/218, 382/232, 239, 240, 243, 244, 250, 253, 276, 382/283; 375/240.16, 240.18, 240.2, 240.22, 375/240.24; 358/452; 704/222
See application file for complete search history.

(56) References Cited

U.S. PATENT DOCUMENTS

| | | | | | |
|---|---|---|---|---|---|
| 4,958,225 | A | * | 9/1990 | Bi et al. | 375/240.22 |
| 5,057,940 | A | * | 10/1991 | Murakami et al. | 382/243 |
| 5,574,573 | A | * | 11/1996 | Ray et al. | 358/452 |
| 5,668,897 | A | * | 9/1997 | Stolfo | 382/283 |
| 5,826,225 | A | * | 10/1998 | Hartung et al. | 704/222 |
| 6,049,632 | A | * | 4/2000 | Cockshott et al. | 382/239 |
| 6,438,268 | B1 | * | 8/2002 | Cockshott et al. | 382/253 |
| 2003/0138159 | A1 | * | 7/2003 | Fryer et al. | 382/253 |
| 2004/0096117 | A1 | * | 5/2004 | Cockshott | 382/253 |

OTHER PUBLICATIONS

Bong-Hwan Kim, Tae-Yong Kim, Jeun-Woo Lee and Heung-Moon Choi; *DCT-Based High Speed Vector Quantization Using Classified Weighted Tree-Structured Codebook*; IEEE International Conference on Systems, Man and Cybernetics; Oct. 14, 1996; pp. 935-940; Cybernetics; New York, NY (XP-000738332).

(Continued)

*Primary Examiner*—Amir Alavi
(74) *Attorney, Agent, or Firm*—Alston & Bird LLP

(57) ABSTRACT

A method of compressing an image frame composed of an array of pixels in the form of digital signals comprises a two stage codebook search. In the first stage the pixelated image frame and the pixelated codebook patches are transformed to frequency domain coefficients and a pattern comparison is made between the coefficients of the image patch and the codebook patches to identify a short list of possible match codebook patches by discarding incorrectly matching patterns. In the second stage the image frame is compared with the short list of codebook patches by any desired method, e.g. by pixel comparisons, to select the best matching codebook patch.

8 Claims, 1 Drawing Sheet

(A) 
Vector 0

(B) 
Vector 1

(C) 
Vector 2

(D) 
Vector 3

(E) 
Vector 4

OTHER PUBLICATIONS

Yih-Chuan Lin and Shen-Chuan Tai; *Dynamic Windowed Codebook Search Algorithm In Vector Quantization*; Optical Engineering; Oct. 1996; pp. 2921-2929; vol. 35 No. 10; Society of Photo-Optical Instrumentation Engineers (XP-000634371).

A.A. Abdelwahab and S.C. Kwatra; *Component Coding Of Color Video Signal With Vector Quantization In The Transform Domain*; Tencon; 1987; pp. 433-437; Seoul (XP-000946213).

Nasser M. Nasrabadi and Robert A. King; *Image Coding Using Vector Quantization: A Review*; IEEE Transactions on Communications; Aug. 1988, pp. 957-971; vol. 36 No. 8; IEEE, Inc., New York, NY (XP-000052119).

Copy of International Search Report for PCT/GB01/00394; completed Apr. 18, 2001.

* cited by examiner (A) Vector 0  (B) Vector 1  (C) Vector 2  (D) Vector 3  (E) Vector 4

CODEBOOK SEARCH METHODS

This application is a 371 of PCT/GB01/0039.4 Jan. 31, 2001

FIELD OF THE INVENTION

Background of the Invention

During image and video compression it may be necessary, dependent upon the mixture of techniques used, to select from a set of candidate image patches that patch which best (in some sense) corresponds to a patch separately held. For instance in the technique commonly known as Vector Quantisation (VQ) a small patch of an image is compared to a set of patches held in a 'codebook' to determine which patch from the codebook can best be used to represent the image patch. This process is often known as 'codebook search'.

Codebook exhaustive search involves the full computation of the actual quality-of-match measure for each codebook patch separately, and the slection of the adopted codebook patch on the basis of these measures. Quality-of-match measures can be of many types including: total absolute pixel differences, total squared pixel differences, averages of these etc. Codebook exhaustive search can be a computational intensive process since, in principle, the process will involve every pixel in the image patch and in the set of all codebook patches. It is therefore desirable, in the interests of computational efficiency and speed, to limit the search process in some way.

It is possible to compare the image patch to a codebook patch directly on the basis of a comparison of the values of equivalent pixels. This is known as an 'image space process'.

BRIEF SUMMARY OF THE INVENTION

It is an object of the present invention to obviate or at least mitigate one or more problems in the prior art.

It is a further object of at least one embodiment of the present invention to provide an improved codebook search method whereby a codebook can be searched in an appreciably faster manner than by exhaustive search.

It is a further object of at least one embodiment of the present invention to seek to exclude from a comparison process all codebook patches that would not be selected as the best match.

It is a yet further object of at least one embodiment of the present invention to provide a codebook search method where occasional non-optimal image patch to codebook patch associations are acceptable, by excluding from the search all codebook patches which, according to some criterion, will probably not be selected as the best match.

In making a decision as to whether a given codebook patch will certainly or probably not be selected some processing must be performed. It is evidently important that this processing be less than that involved in fully evaluating that codebook patch as to whether it is the best match.

According to a first aspect of the present invention there is provided a codebook search method comprising the steps of:

a) providing a plurality of codebook patches;

b) providing at least one image patch;

c) transforming by means of a lossless transform the plurality of codebook patches and the at least one image patch into sets of frequency domain codebook coefficients and a set(s) of frequency domain image coefficients, respectively;

d) for the/each image patch selecting a shortlete (ie. shortlist) of possible match codebook patches by means of a pattern comparison of + and − signs of the image coefficients of the/each image patch with the codebook coefficients; and e) undertaking a further comparison of the image patch(es) against the shortlete codebook patches to select a substantially best match, this further comparison being effected by any desired method.

It will be appreciated that steps (a) to (e) may be carried out in any suitable order, and that indeed one or more of the steps may be carried out substantially simultaneously, if appropriate. However, preferably the steps are undertaken in the order (a), (b), (c), (d) and then (e), though steps (a) and (b) may be carried out in the order (b) then (a).

Each set of codebook coefficients or image coefficients thus represents a frequency spectrum of a pixel value distribution across a codebook patch or image patch, respectively.

The frequency domain codebook and image coefficients may be said to be characteristics of a 'frequency space'.

Herein, a lossless transform is defined as one which permits an original data distribution to be reconstructed precisely by use of an 'inverse transform' process.

The lossless transform may be selected from one of a Haddamard transform, Wavelets, a discrete cosine transform or the like.

In a particular embodiment the number of image coefficients used in the pattern comparison may at least initially be equal in number to the number of pixels in a patch.

However, in a modification the number of image coefficients required to make a comparison may be reduced, eg. to those most significant in the frequency spectrum, eg. down to typically 15.

Each frequency space coefficient is representative of a property that is global to the transformed patch, whereas, a pixel value is representative only of one specific point in the patch, and can convey little or no global information. Useful patch comparisons can, therefore, be made on the basis of a small subset of all the frequency coefficients but which could not be made on an equivalent subset of the pixels in the original patch(es). It should be noted that in a lossless transform there will be as many frequency coefficients as there are pixels in the transformed patch.

Preferably, the transform is computed for each of the codebook patches and the codebook coefficients stored with the codebook patch to which they apply.

Preferably also, the transform is computed for each image patch as it comes under examination.

In a preferred embodiment, a subset of the coefficients is selected. For example, a set of 16 coefficients which represent predetermined most significant frequency properties of the pixel value distribution, eg. the lowest 16 frequencies of the pixel value distribution. It will be appreciated, however, that a different number of coefficients could be chosen, or coefficients representative of different portions of the frequency spectrum.

Further, for each codebook patch a 'sign string' may be established. A sign string may, for example, comprise a 16-bit pattern in which each bit corresponds to a specific instance of the set of 16 coefficients chosen for examination. Each bit in the string may be assigned a first value, eg. 0, if the corresponding coefficient is negative or a second value, eg. 1, if it is positive.

Yet further, for each codebook patch an 'amplitude significance string' may be established. An amplitude significance string may, for example, comprise a 16-bit pattern in which each bit corresponds to a specific instance of the set of 16 coefficients chosen for examination. Each bit in the string may be assigned a first value, eg. 0, if the corresponding coefficient is 'insignificant', or a second value, eg. 1, if it is 'significant'. A coefficient may be considered significant if its absolute value exceeds a threshold value and insignificant otherwise. The threshold value may be set as a defined fraction of the average absolute amplitude of all the 16 coefficients selected for each of the patches in the codebook. It will be appreciated, however, that there may be other ways of assigning such a threshold value. It is not required that there should be a single threshold value for all coefficients. Indeed, there could be created other criteria for judging significance.

It should be noted that all these codebook computations may be performed off-line, and therefore represent no overhead during use of an encoder.

When an image patch is selected for examination its Haddamard coefficients may be established in a manner analogous to that for a single codebook patch. Further, a sign string may also be established for an image patch.

A codebook block or patch may be accepted for further examination, or rejected, as follows:

1. A bitwise 'exclusive or' of the sign strings of the codebook patch and the image patch may be computed. This is a set of bits, each of which is of a first value, eg. 0, if the corresponding bits in the sign strings are the same and of a second value, eg. 1, if they are different. E.g. the bitwise exclusive or of 0011 with 0110 would produce 0101.

2. The bit-string so produced may be bitwise ANDed with the significance string of the codebook patch. The bitwise AND is a set of bits, each of which is set to a first value, eg. 1, if the corresponding bits in the two strings are equal to the first value and to a second value 0 otherwise e.g. the bitwise AND of 0110 with 0101 would produce 0100. The effect of this operation is to set to a first value, eg. 0, all bits that are 'insignificant' and to leave all 'significant' bits unchanged.

3. The final resulting bit pattern may be examined and if every bit is of a first value, eg. 0, the codebook patch may be accepted for further examination, otherwise it may be rejected. The effect of this decision may be to ensure that every significant coefficient in the codebook set has the same sign as the corresponding coefficient in the image patch set; insignificant coefficients being disregarded. Such codebook patches should bear a closer resemblance to the image patch than will codebook patches that have significant coefficients of opposite sign.

There remains a second case in which a codebook patch should be retained for examination. This is the case where the codebook and image patches are similar except that the codebook patch needs to be inverted before use, i.e. each of its pixel values must be multiplied by −1. The codebook patches are normalised in the sense that their pixel values are restricted to lie between plus and minus 1. This has implications for the computation of similarity with image patches (which typically will have pixel values in the range 0 to 127) but has no implications for the accept/reject criteria. An advantage of this method is that the use of frequency space coefficients eliminates the need to adjust the codebook patch pixel values before use.

The sequence of operations required to determine whether to retain a codebook patch for further examination on this basis may be as follows.

1. The bitwise exclusive-or of the sign strings of the codebook patch and the image patch may be established.

2. The bit-string so produced may be bitwise ORed with the inverse of the significance string of the codebook patch. A bitwise OR produces set of bits, each of which is set to a second value, eg. 1 if one or more of corresponding bits in the two strings is of a second value, eg. 1 and to a first value, eg. 0, otherwise e.g. the bitwise OR of 0110 with 0101 would produce 0111. Inversion of a bit-string converts each first value to a second value, and vice versa eg. 0 to 1 and each 1 to 0. E.g. the inverse of 0110 is 1001.

3. The final resulting bit pattern may be examined and if every bit is 1 the codebook patch is accepted for further examination, otherwise it is rejected. The effect of this decision is to ensure that significant coefficients in the codebook set has the opposite sign to a corresponding coefficient in the image patch set; insignificant coefficients are disregarded.

There are thus two criteria upon which a codebook patch may be retained for further examination. Rejected patches need not be examined further as potential matches for the current image patch and may not therefore contribute further to the computational burden. The computation so avoided more than compensates for the additional computation involved in any computation of the Haddamard transform coefficients for the image patch and their use in determining accept/reject for the codebook patches. The method therefore can provide a very useful increase in speed for the searching of a codebook.

The Haddamard coefficients can further be used to compute the mismatch between a codebook patch and an image patch for purposes of determining the quality of a match and hence of the best patch to select from a codebook as the equivalent of an image patch.

The difference E between a codebook patch and an image patch can be expressed as:

$$E = \sum_i (W_i^T * \sigma - X_i^T)^2$$

where $W_i^T$ denotes the ith transform coefficient for the codebook patch, σ is a contrast multiplier and $X_i^T$ is the $i^{th}$ transform coefficient for the image patch. σ can be computed from the coefficients.

E can be estimated by summation over a subset of the coefficients and it can be shown that the estimate monotonically approaches the true value of E as the number of coefficients used increases. E bears a direct relationship (multiplication by a computable factor) to the error computed by an analogous formula involving the pixel values in the image space versions of the patches.

Thus, the use of frequency domain or space coefficients permits selection of a best match between an image patch and a delivered codebook in an integrated and efficient manner.

According to a second aspect of the present invention there is provided a method of compressing an image frame composed of an array of pixels in the form of digital signals, including the step of providing a codebook search method which comprises the steps of:

a) providing a plurality of codebook patches;

b) providing at least one image patch;

c) transforming by means of a lossless transform the plurality of codebook patches and the at least one image patch into sets of frequency domain codebook coefficients and a set(s) of frequency domain image coefficients, respectively;

d) for the/each image patch selecting a shortlete of possible match codebook patches by means of a pattern comparison of + and − signs of the image coefficients of the/each image patch with the codebook coefficients; and e) undertaking a further comparison of the image patch(es) against the shortlete codebook patches to select a substantially best match, this further comparison being effected by any desired method.

According to a third aspect of the present invention there is provided an apparatus for compressing an array of data entries in the form of digital signals, the apparatus comprising a computer apparatus, for example of known type, set up to run a program embodying a codebook search method according to the first aspect.

According to a fourth aspect of the present invention there is provided a computer program product carrying a computer program adapted to perform the codebook search method according to the first aspect.

The computer program product may be a floppy disk, CD or the like.

According to a fifth aspect of the present invention there is provided a computer program adapted to perform the codebook search method according to the first aspect.

BRIEF DESCRIPTION OF THE DRAWINGS

An embodiment of the present invention will now be described by way of example only, with reference to the accompanying drawings which are.

DETAILED DESCRIPTIONS OF EMBODIMENTS OF THE INVENTION

Figure 1:
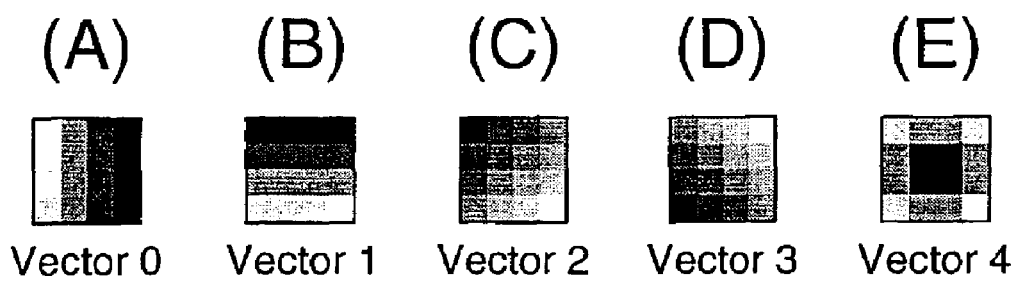
FIGS. 1 (A)–(E) a schematic view of a codebook having five codebook patches or vectors each representing a 4×4 pixel image block for use in an embodiment of the present invention.

By way of illustration, and as shown in FIGS. 1(A) to (E), in an embodiment of a codebook search method (fast search process) according to the present invention, a codebook having five vectors 0, 1, 2, 3 and 4, each with a dimensionality of sixteen is provided. Each of the five vectors represents an image block of 4×4 pels as shown in FIG. 1. Actual pel values assigned to each vector are given in Table 1 hereinbelow, where $f_c(i,j)$ denotes the pel value at position i,j.

When searching in the spatial domain, each vector element (ie. pixel) is equally significant and is, therefore, included in the evaluation of each codebook vector (patch) as a potential match to a source image block. However, according to the invention, transforming each codebook vector into the frequency domain using an appropriate transform function (the basis vectors of the function being orthogonal) gives a set, of transform coefficients equal in number to the number of pixels in each codebook vector.

The frequency domain concentrates the most significant information about each codebook vector into a small number of coefficients allowing both the rapid rejection of codebook vectors that do not well represent the source image block, and the identification of a good match from the remaining codebook vectors, by comparing a sub-set of the total transform coefficients.

The Walsh-Haddamard Transform has been found to be both simple and efficient for the purpose of codebook search. The forward 2-D Haddamard transform is given by;

$$H(u, v) = \frac{1}{N^2} \sum_{x=0}^{N-1} \sum_{y=0}^{N-1} f(x, y)(-1)^{\sum_{i=0}^{n-1} [\beta(i, x)\beta(i, u) + \beta(i, y)\beta(i, v)]} \quad (1)$$

where, $n = \log_2 N$, and the function $\beta(q,r)$ is defined as;

$$\beta(q, r) = \begin{cases} 0 \text{ if bit } q \text{ in the binary representation of } r \text{ is zero} \\ 1 \text{ if bit } q \text{ in the binary representation of } r \text{ is zero} \end{cases}$$

The significance of a frequency coefficient is defined in terms of its discriminatory power within the codebook; i.e. the degree of change in the coefficient across the codebook vectors, and hence its "usefulness" in segmenting the codebook into vectors that are similar/dissimilar to a source vector.

Applying the Haddamard Transform to the codebook in FIGS. 1(A) to (E) gives the transform coefficients shown in Table 2 hereinbelow, where $H_c(u,v)$ denotes the value of coefficient u,v from the 2-D representation of the frequency space. The relative significance of each coefficient within the codebook as a whole may be given by the mean absolute magnitude of each coefficient with respect to all the codebook vectors, or by the standard deviation of each coefficient. The standard deviation of each coefficient within the codebook is shown in Table 2.

Sorting the Haddamard coefficients by standard deviation gives a coefficient significance ordering of:
2→8→12→3→1→4→14→11→15→10→9→5→13→7→6→0
where coefficient 2 has the greatest standard deviation.

Figure 2:
FIG. 2 a schematic view of a source 4×4 pixel image block or patch for use in the embodiment referred to in FIG. 1.

Consider the source block shown in FIG. 2 having the pel values and transform coefficients as given in Table 3, where $f_s(i,j)$ denotes the pel intensity at position i,j within the source image block. Note that the transform coefficient $H_3(0,0)$ corresponds to the DC value or mean of the source block.

Matching in the spatial domain is done using an error function:

$$\epsilon = \sum_{x=0}^{N-1} \sum_{y=0}^{N-1} (f_s(x, y) - \sigma f_c(x, y) - \gamma)^2 \quad (2)$$

where σ is a contrast adjustment applied equally to all codebook elements, and γ is the mean of the source block. An optimal value for σ is given by:

$$\sigma = \frac{\sum_{x=0}^{N-1} \sum_{y=0}^{N-1} [f_s(x, y) - \gamma] f_c(x, y)}{\sum_{x=0}^{N-1} \sum_{y=0}^{N-1} (f_c(x, y))^2} \quad (3)$$

The optimal value of σ and the corresponding error ε between the source block and each codebook vector is shown in Table 4. From the table it is clear that the best "fit" to the source block is from codebook vector 0 with a negative contrast adjustment.

The first step in searching the codebook using frequency space is to discard those codebook vectors that are "unlikely" to give a good approximation to the source block. This is done by matching on the sign of the most significant coefficients.

Taking the significance order as determined by the standard deviation of each coefficient, the first Q coefficients, where Q is less than the total number of coefficients, may be used to discard poor matches. The following worked example illustrates this using the first 6 significant Haddamard coefficients:

Table 5 below shows the significance of coefficients 2, 8, 12, 3, 1 and 4, where the significance is 0 if the coefficient has an absolute magnitude less than a threshold, otherwise the significance is represented by the sign of the coefficient. For this example, the threshold used to select significance is for the coefficient to have an absolute value greater or equal to 25% of the mean absolute magnitude for all the codebook coefficients.

For each codebook vector, form a string of bits (one per coefficient) where a bit is 0 if the corresponding coefficient is less than zero or 1 if the corresponding coefficient greater or equal to zero. This is the sign string or mask. The sign masks for each of the codebook vectors are given in Table 6.

For each codebook vector, create a bit significance mask (one per coefficient), based on the amplitude significance of each of the coefficients. A bit is only one if the corresponding coefficient is non-zero in Table 5. The significance masks for each of the codebook vectors are given in Table 7.

Construct a sign mask for the source block to be matched where each bit gives the sign of the respective coefficient. The sign mask for the source block is shown in Table 8.

Determine the match for a positive contrast adjustment by performing a bit-wise exclusive-or between the source sign mask and each codebook sign mask. For an exclusive-or, the result is a zero if the two source bits have the same value and is one if they have different values. Any 1's in the result indicates a difference in sign between the source and codebook coefficients. To determine the quality of the match, a bit-wise AND between the result of each bit-wise exclusive-or and the significance mask of each codebook vector is performed. The codebook vector is only considered a potential match if the result contains no 1's. Table 9 shows the result of the bit-wise exclusive-or followed by the bit-wise AND for each codebook vector.

Determine the match for a negative contrast adjustment by performing a bit-wise exclusive-or between the source sign mask and the inverse of each codebook sign mask. Any 1's in the result indicates a difference in sign between the source and codebook coefficients. To determine the quality of the match, a bit-wise AND between the result of each bit-wise exclusive-or and the significance mask of each codebook vector is performed. As before, the codebook vector is only considered a potential match if the result contains no 1's. Table 10 shows the result of the inverse bit-wise exclusive-or followed by the bit-wise AND for each codebook vector.

The match using the sign of each coefficient taken together with the significance yields three possible candidate matches. For positive contrast (as shown in Table 9), codebook vectors 1 and 2 have the correct significant signs. For negative contrast (as shown in table 10), codebook vector 0 has the correct significant signs. In other words, codebook vectors 3 and 4 have been rejected from the search process.

The best match from codebook vectors 0, 1 and 2 could be calculated in the spatial domain using Equation 2, but this is computationally expensive. An alternative is to calculate the match between the source block and the remaining codebook vectors in the frequency domain.

For the search in the frequency domain to be less computationally expensive than searching in the spatial domain, the error must be determined using a sub-set of the coefficients. This is done by applying a "cut-off" to the error calculation. To understand the "cut-off" search, it is necessary to understand how the error in the frequency domain relates to the error in the spatial domain.

Let w be a codebook vector representing a block of intensity values, where the mean of the intensity values is zero and the vector is of unit length. The match $\epsilon$ between a source vector $\vec{x}$ and the vector $\vec{w}$ must, therefore, include the multiplication of the codebook vector elements by a constant contrast adjustment $\sigma$, plus the addition to each modified vector element of a constant intensity offset $\gamma$. This match is defined as, $$\epsilon = \sum_{i=0}^{N-1}(x_i - \sigma\omega_i - \gamma)^2 \quad (4)$$

where $x_i$ is the $i^{th}$ element of the source block vector $\vec{x}$, $\omega_i$ is the $i^{th}$ element of the codebook vector $\vec{w}$, and N is the dimensionality of the vectors $\vec{x}$ and $\vec{w}$. This equation is equivalent to Equation 2 where the two-dimensional intensity values are mapped onto the elements of a vector.

The optimal values for $\sigma$ and $\gamma$ to minimise $\epsilon$ are calculated from $$\frac{d\varepsilon}{d\sigma} = \frac{d\varepsilon}{d\gamma} = 0$$

as follows:

as $$\sum_{i=0}^{N-1}\omega_i = 0, \text{ and } \sum_{i=0}^{N-1}\omega_i^2 = 1,$$

then Equation 4 can be expressed as:

$$\epsilon = \sum_{i=0}^{N-1}x_i^2 - 2\gamma\sum_{i=0}^{N-1}x_i - 2\sigma\sum_{i=0}^{N-1}x_i\omega_i + \sigma^2 + N\gamma^2 \quad (5)$$

giving:

$$\frac{d\epsilon}{d\gamma} = 2N\gamma - 2\sum_{i=0}^{N-1}x_i = 0 \Rightarrow \gamma = \frac{1}{N}\sum_{i=0}^{N-1}x_i \quad (6)$$

$$\frac{d\epsilon}{d\sigma} = 2\sigma - 2\sum_{i=0}^{N-1}x_i\omega_i = 0 \Rightarrow \sigma = \sum_{i=0}^{N-1}x_i\omega_i \quad (7)$$

Since both $$\frac{d^2\epsilon}{d\gamma^2}$$

and $$\frac{d^2\epsilon}{d\sigma^2}$$

are positive, $$\frac{d\epsilon}{d\sigma} = \frac{d\epsilon}{d\gamma} = 0$$

represents a minimum of $\epsilon$. Thus substituting the optimal values for $\gamma$ and $\sigma$ into Equation 5 gives a best match between $\vec{x}$ and $\vec{w}$ of:

$$\epsilon = \sum_{i=0}^{N-1} x_i^2 - \frac{1}{N}\left(\sum_{i=0}^{N-1} x_i\right)^2 - \left(\sum_{i=0}^{N-1} x_i w_i\right)^2 \quad (8)$$

From equation 8 it can be seen that given a set W of normalised codebook vectors, where $W = \{\vec{w}_0, \vec{w}_1, \ldots, \vec{w}_c\}$, the best match to an arbitrary source block vector $\vec{x}$ is the codebook $\vec{w}_j \in W$ that gives the maximum absolute value for $\sigma$. That is, $$\left|\sum_{i=0}^{N-1} x_i \omega_{j,i}\right| \geq \left|\sum_{i=0}^{N-1} x_j w_{k,i}\right| \quad \forall \vec{w}_k \in W \quad (9)$$

where $\omega_{j,i}$ is the $i^{th}$ element of the codebook vector $\vec{w}_j$.

Equation 4 represents the error in the spatial domain between a source vector $\vec{x}$ and codebook vector $\vec{w}$. Each element of $\vec{x}$ and $\vec{w}$ represents the spatial structure of the source and codebook blocks respectively and contributes equally to the error $\epsilon$. The elements of $\vec{x}$ and $\vec{w}$ are said to have equal "energy".

An alternative is to perform the match between the source and codebook blocks in the frequency domain. Unlike the spatial domain, the energy is concentrated into a few low frequency coefficients allowing the quality of the match between $\vec{x}$ and $\vec{w}$ to be assessed from a small sub-set of the total coefficients. However to be of value, the match in the frequency domain must correspond to the match in the spatial domain.

Let $\vec{X}$ and $\vec{W}$ be N element vectors where the $j^{th}$ element of $\vec{x}$ and $\vec{W}$ are given by:

$$X_j = \sum_{i=0}^{N-1}(x_i - \bar{x})z_{j,i}, \quad W_j = \sum_{i=0}^{N-1} w_i z_{j,i}$$

where $z_{j,i}$ is the $i^{th}$ element of an N element vector $\vec{z}_j$, and $\bar{x}$ is the mean of the elements of the vector $\vec{x}$.

Let $\epsilon$ be the sum of the squared difference between the equivalent elements of $\vec{X}$ and $\vec{W}$ weighted by $\sigma$ such that;

$$\varepsilon = \sum_{j=0}^{N-1}(X_j - \sigma W_j)^2 \quad (10)$$

$$= \sum_{j=0}^{N-1}\left(\sum_{i=0}^{N-1} z_{j,i}(x_i - \bar{x} - \sigma\omega_i)\right)^2$$

$$= \sum_{j=0}^{N-1}\sum_{i=0}^{N-1}\sum_{k=0}^{N-1}(Z_{j,i}Z_{j,k}(x_i - \bar{x} - \sigma\omega_i)(x_k - \bar{x} - \sigma\omega_k))$$

$$= \sum_{j=0}^{N-1}\sum_{k=0}^{N-1}\left((x_i - \bar{x} - \sigma\omega_i)(x_k - \bar{x} - \sigma\omega_k)\sum_{j=0}^{N-1} Z_{j,i}Z_{j,k}\right)$$

Using the 1-D Haddamard transform, one can define each vector $\vec{z}_j$ as a basic function such that:

$$z_{j,i} = \frac{1}{N}(-1)^{\sum_{l=0}^{n-1}\beta(j,l)\beta(i,l)} \quad (12)$$

where, $n = \log_2 N$, and the function $\beta(q,r)$ is defined as:

$$\beta(q, r) = \begin{cases} 0 & \text{if bit } q \text{ in the binary representation of } r \text{ is zero} \\ 1 & \text{if bit } q \text{ in the binary representation of } r \text{ is one} \end{cases}$$

Since for the Haddamard transform:

$$\sum Z_{j,i}Z_{j,k} = \begin{cases} 0 & \text{if } i \cdot k \\ \frac{1}{N} & \text{if } i = k \end{cases} \quad \forall i, k \in \{0, 1, \ldots, N-1\} \quad (13)$$

then equation 10 can be simplified to:

$$\varepsilon = \frac{1}{N}\sum_{i=0}^{N-1}(x_i - \bar{x} - \sigma w_i)^2 \quad (14)$$

As $\bar{x} \equiv \gamma$ in Equation 4, the match in the frequency domain can be expressed in terms of the match in the spatial domain as, $$\varepsilon = \frac{\epsilon}{N} \quad (15)$$

Thus for the Haddamard transform, the error $\epsilon$ in the spatial domain is equal to N times the error $\epsilon$ in the transform domain.

For n Haddamard coefficients, where $1 \leq n \leq N$, let the error between the first n coefficients be:

$$\varepsilon_n - \sum_{i=0}^{n-1} (X_i - \sigma_n W_i)^2 \quad (16)$$

where $\sigma_n$ is the contrast multiplier giving the best "fit" between the first n source and codebook Haddamard coefficients. If, $$A_n = \sum_{i=0}^{n-1} X_i^2, \; B_n = \sum_{i=0}^{n-1} (X_i W_i), \; C_n = \sum_{i=0}^{n-1} W_i^2$$

then the error $\epsilon_n$ can be expressed as;

$$\epsilon_n = A_n - 2\sigma_n B_n + \sigma_n^2 C_n \quad (17)$$

The optimal value of $\sigma_n$ is calculated from;

$$\frac{d\varepsilon_n}{d\sigma_n} = 2\sigma_n C_n - 2B_n = 0 \Rightarrow \sigma_n = \frac{B_n}{C_n} \quad (18)$$

Thus the error for n coeffs with optimised $\sigma_n$ is given by:

$$\varepsilon_n = A_n - \frac{B_n^2}{C_n} \quad (19)$$

To reduce search time, it is desirable to "cut-off" the calculation of the error following the evaluation of error based on a sub-set of the total Haddamard coefficients. That is, terminate the calculation if the error $\epsilon_m$ is greater than the minimum error derived for a codebook match, where m<N. This cut-off is only possible if $\epsilon_n \leq \epsilon_{n-1}$.

Proof:

$$\begin{aligned}
\varepsilon_n - \varepsilon_{n-1} &= A_n \frac{B_n^2}{C_n} - A_{n-1} + \frac{B_{n-1}^2}{C_{n-1}} \\
&= A_{n-1} + X_n^2 - \frac{(B_{n-1} + X_n W_n)^2}{C_{n-1} + W_n^2} - A_{n-1} + \frac{B_{n-1}^2}{C_{n-1}} \\
&= \frac{C_{n-1}^2 X_n^2 + B_{n-1}^2}{C_{n-1}} - \frac{(B_{n-1} + X_n W_n)^2}{C_{n-1} + W_n^2} \\
&= \frac{(C_{n-1} X_n - B_{n-1} W_n)^2}{C_{n-1}^2 + C_{n-1} W_n^2}
\end{aligned}$$

$$\Rightarrow \varepsilon_n - \varepsilon_{n-1} \geq 0$$

since $(C_{n-1}X_n - B_{n-1}W_n)^2 \geq 0$ and $(C_{n-1}^2 + C_{n-1} W_n^2) \geq 0$.

As $\epsilon_n \geq \epsilon_{n-1}$, the evaluation of the best codebook vector can be implemented by the following algorithm, where the codebook coefficients are assumed to be ordered by significance such that the last coefficient (coefficient N-1) is the DC value which has the value zero for all the codebook vectors.

Algorithm:

for the first codebook coefficient vector $\vec{W}_0$ do $$\text{set best error} = A_{N-1} - \frac{B_{N-1}^2}{C_{N-1}}$$

store the index of the first codebook vector as the best fit to $\vec{X}$ end for for each remaining codebook coefficient vector $\vec{W}_c$ do set the coefficient index j to one do calculate $$\varepsilon = A_j - \frac{B_j^2}{C_j}$$

increment j by one while j<N and $\epsilon$<best error if $\epsilon$<best error then set best error=$\epsilon$ store the index of the codebook vector as the best fit to $\vec{X}$ end if end for This algorithm can be applied to the numerical example to determine the best match from codebook vectors 0, 1 or 2.

Table 11 gives the results of following the search algorithm. The error in frequency space for codebook vector 0, as the first vector, is evaluated from equation 19 with n=15. This gives the best error value for the subsequent search. Calculating the error between the first two coefficients for codebook vector 1 gives an error that exceeds the best error and thus vector 1 is rejected. The match between the source and codebook vector 3 is evaluated up-to 14 out of the 15 coefficients before the error exceeds the best error. As codebook vector 0 gave the minimum error, it represents the best match to the source block.

The final step is to calculate the contrast for codebook vector 0 that will map it onto the source block. Equation 18 gives a contrast of −0.944. Hence an optimal codebook vector with corresponding contrast can be determined by matching in both the spatial and frequency domain. A key advantage of using the frequency domain is a reduction in calculation necessary to determine a best match using both the significance of the source block frequency coefficients to discard poor matches and the error cut-off. Though the error cut-off could be applied in the spatial domain, it gives little benefit as the majority of pels must be used in the error calculation.

Note that the difference between the optimal contrast calculated in the spatial domain and in the frequency domain is due to loss of accuracy in the transform process.

It will be appreciated that the embodiment of the invention hereinbefore described is given by way of example only, and is not meant to limit the scope of the invention in any way.

It will further be appreciated that various modifications may be made without departing from the invention. For example, the specific embodiment hereinbefore described provides a method of making a comparison of image and codebook patches with the objective of eliminating—for low computational cost—codebook patches which will probably not be the best match to a supplied image patch. The frequency transform adopted in the specific embodiment is the Haddamard transform, though it will readily be recognised that other frequency transforms could be used in a similar fashion.

Further, it will be appreciated that the final selection of the best matching patch, from amongst those not rejected initially, can be made using the frequency space coefficients themselves. This in itself represents a reduction of computation in comparison to the determination of match quality of non-rejected codebook patches using image space.

It is further envisaged that the invention may find use in compression of 'still' two dimensional image frames or compression of a set of image frames forming a video sequence. One specific application is that of transmission of video images between videophones.

Yet further, it will be appreciated that the coefficients in the frequency domain are effectively an average type or global type of characterisation of each pattern in contradistinction to pixel data which is not.

TABLE 1

Values assigned to the elements of the codebook vectors.

| VECTOR ELEMENT | CODEBOOK VECTOR | | | | |
|---|---|---|---|---|---|
| | VECTOR 0 | VECTOR 1 | VECTOR 2 | VECTOR 3 | VECTOR 4 |
| 0 $f_c(0,0)$ | 128 | −127 | −127 | −6 | 113 |
| 1 $f_c(1,0)$ | 63 | −125 | −87 | 43 | 1 |
| 2 $f_c(2,0)$ | −62 | −127 | −32 | 85 | 3 |
| 3 $f_c(3,0)$ | −127 | −125 | −7 | 128 | 123 |
| 4 $f_c(0,1)$ | 128 | −57 | −87 | −47 | −17 |
| 5 $f_c(1,1)$ | 63 | −61 | −42 | 0 | −127 |
| 6 $f_c(2,1)$ | −62 | −47 | −1 | 23 | −122 |
| 7 $f_c(3,1)$ | −127 | −47 | 43 | 85 | 7 |
| 8 $f_c(0,2)$ | 128 | 43 | −32 | −74 | −7 |
| 9 $f_c(1,2)$ | 58 | 53 | 0 | −32 | −115 |
| 10 $f_c(2,2)$ | −57 | 63 | 43 | −5 | 122 |
| 11 $f_c(3,2)$ | −124 | 55 | 85 | 33 | 13 |
| 12 $f_c(0,3)$ | 125 | 124 | 0 | −127 | 109 |
| 13 $f_c(1,3)$ | 53 | 125 | 33 | −74 | 1 |
| 14 $f_c(2,3)$ | −62 | 125 | 83 | −32 | 12 |
| 15 $f_c(3,3)$ | −125 | 128 | 128 | 0 | 128 |

TABLE 2

Haddamard Transform coefficients for the codebook given in FIG. 1.

| HADDAMARD COEFFICIENT | COEFFICIENT MAGNITUDE | | | | | STANDARD DEVIATION |
|---|---|---|---|---|---|---|
| | VECTOR 0 | VECTOR 1 | VECTOR 2 | VECTOR 3 | VECTOR 4 | |
| 0 $H_c(0,0)$ | 0 | 0 | 0 | 0 | 0 | 0 |
| 1 $H_c(1,0)$ | 133 | −1 | −76 | −91 | −15 | 79 |
| 2 $H_c(2,0)$ | 373 | −12 | −171 | −158 | −21 | 196 |
| 3 $H_c(3,0)$ | 3 | −3 | 1 | −4 | 234 | 93 |
| 4 $H_c(0,1)$ | 3 | −145 | −78 | 86 | 4 | 78 |
| 5 $H_c(1,1)$ | 0 | −1 | 7 | 5 | −2 | 3 |
| 6 $H_c(2,1)$ | 0 | 1 | 3 | 3 | 8 | 2 |
| 7 $H_c(3,1)$ | −1 | −6 | −4 | −1 | 3 | 3 |
| 8 $H_c(0,2)$ | 2 | −358 | −170 | 155 | −9 | 174 |
| 9 $H_c(1,2)$ | −3 | 1 | 0 | −9 | 2 | 4 |
| 10 $H_c(2,2)$ | 7 | 0 | −2 | −7 | 0 | 4 |
| 11 $H_c(3,2)$ | −3 | 5 | −9 | 8 | 1 | 6 |
| 12 $H_c(0,3)$ | −3 | −1 | −4 | 8 | 245 | 98 |
| 13 $H_c(1,3)$ | 0 | −2 | 5 | 3 | 7 | 3 |
| 14 $H_c(2,3)$ | 0 | 10 | −5 | 14 | 0 | 7 |
| 15 $H_c(3,3)$ | 1 | 4 | −3 | −9 | −6 | 4 |

TABLE 3

Source block pel values and transform coefficients

| Source Pel Value | | Transform Coefficient | |
|---|---|---|---|
| $f_s(0,0)$ | 0 | $H_s(0,0)$ | 519 |
| $f_s(1,0)$ | 1 | $H_s(1,0)$ | −147 |
| $f_s(2,0)$ | 63 | $H_s(2,0)$ | −342 |
| $f_s(3,0)$ | 241 | $H_s(3,0)$ | −7 |
| $f_s(0,1)$ | 0 | $H_s(0,1)$ | −63 |
| $f_s(1,1)$ | 24 | $H_s(1,1)$ | 4 |

TABLE 3-continued

Source block pel values and transform coefficients

| Source Pel Value | | Transform Coefficient | |
|---|---|---|---|
| $f_s(2,1)$ | 159 | $H_s(2,1)$ | −8 |
| $f_s(3,1)$ | 250 | $H_s(3,1)$ | 49 |
| $f_s(0,2)$ | 2 | $H_s(0,2)$ | −150 |
| $f_s(1,2)$ | 102 | $H_s(1,2)$ | 0 |
| $f_s(2,2)$ | 248 | $H_s(2,2)$ | −1 |
| $f_s(3,2)$ | 255 | $H_s(3,2)$ | 129 |
| $f_s(0,3)$ | 20 | $H_s(0,3)$ | −1 |
| $f_s(1,3)$ | 204 | $H_s(1,3)$ | −36 |
| $f_s(2,3)$ | 252 | $H_s(2,3)$ | 49 |
| $f_s(3,3)$ | 255 | $H_s(3,3)$ | 5 |

TABLE 4

Optimal σ and error from each codebook vector

| CODEBOOK VECTOR | OPTIMAL σ | ERROR (ε) |
|---|---|---|
| 0 | −0.945 | 48350 |
| 1 | 0.457 | 157316 |
| 2 | 1.397 | 51142 |
| 3 | 0.597 | 165121 |
| 4 | 0.073 | 187906 |

TABLE 5

Significance of principal coefficients in codebook

| HADDAMARD COEFFICIENT | VECTOR 0 | VECTOR 1 | VECTOR 2 | VECTOR 3 | VECTOR 4 |
|---|---|---|---|---|---|
| 2 H(2,0) | 1 | −1 | −1 | −1 | −1 |
| 8 H(0,2) | 0 | −1 | −1 | 1 | −1 |
| 12 H(0,3) | 0 | 0 | 0 | 1 | 1 |
| 3 H(3,0) | 0 | 0 | 0 | 0 | 1 |
| 1 H(1,0) | 1 | 0 | −1 | −1 | −1 |
| 4 H(0,1) | 0 | −1 | −1 | 1 | 0 |

TABLE 6

Sign mask for each codebook vector.

| CODEBOOK VECTOR | COEFFICIENT BIT | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| 0 | 1 | 1 | 1 | 1 | 1 | 1 | 1 | 0 | 1 | 0 | 1 | 0 | 0 | 1 | 1 | 1 |
| 1 | 1 | 0 | 0 | 0 | 0 | 0 | 1 | 0 | 0 | 1 | 1 | 1 | 0 | 0 | 1 | 1 |
| 2 | 1 | 0 | 0 | 1 | 0 | 1 | 1 | 0 | 0 | 1 | 0 | 0 | 0 | 1 | 0 | 0 |
| 3 | 1 | 0 | 0 | 0 | 1 | 1 | 1 | 0 | 1 | 0 | 0 | 1 | 1 | 1 | 0 | 0 |
| 4 | 1 | 0 | 0 | 1 | 1 | 0 | 1 | 1 | 0 | 1 | 1 | 1 | 1 | 1 | 1 | 0 |

TABLE 7

Significance mask for each codebook vector.

| CODEBOOK VECTOR | COEFFICIENT BIT | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| 0 | 1 | 1 | 0 | 0 | 0 | 0 | 0 | 0 | 0 | 0 | 0 | 0 | 0 | 0 | 0 | 0 |
| 1 | 0 | 0 | 1 | 0 | 1 | 0 | 0 | 0 | 1 | 0 | 0 | 0 | 0 | 0 | 0 | 0 |
| 2 | 0 | 1 | 1 | 0 | 1 | 0 | 0 | 0 | 1 | 0 | 0 | 0 | 0 | 0 | 0 | 0 |
| 3 | 0 | 1 | 1 | 0 | 1 | 0 | 0 | 0 | 1 | 0 | 0 | 1 | 0 | 0 | 0 | 0 |
| 4 | 0 | 1 | 1 | 1 | 0 | 0 | 0 | 0 | 1 | 0 | 0 | 1 | 0 | 0 | 0 | 0 |

TABLE 8

Sign mask for source block.
COEFFICIENT BIT

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 0 | 1 | 0 | 1 | 0 | 1 | 0 | 1 | 0 | 0 | 1 | 1 |

TABLE 9

Match based on sign of significant coefficients for + ve contrast.

| CODEBOOK VECTOR | COEFFICIENT BIT | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 1 | 1 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 1 | 0 | 0 | 0 | 1 | 0 | 0 | 0 | 1 | 0 | 0 | 0 |
| 4 | 0 | 0 | 0 | 1 | 0 | 0 | 0 | 0 | 0 | 0 | 0 | 0 | 1 | 0 | 0 | 0 |

TABLE 10

Match based on sign of significant coefficients for negative contrast.

| CODEBOOK VECTOR | COEFFICIENT BIT | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 0 | 0 | 0 | 0 | 0 | 0 | 0 |
| 1 | 0 | 0 | 1 | 0 | 1 | 0 | 0 | 0 | 1 | 0 | 0 | 0 | 0 | 0 | 0 | 0 |
| 2 | 0 | 1 | 1 | 0 | 1 | 0 | 0 | 0 | 1 | 0 | 0 | 0 | 0 | 0 | 0 | 0 |
| 3 | 0 | 1 | 1 | 0 | 0 | 0 | 0 | 0 | 0 | 0 | 0 | 0 | 0 | 0 | 0 | 0 |
| 4 | 0 | 1 | 1 | 0 | 0 | 0 | 0 | 0 | 1 | 0 | 0 | 0 | 0 | 0 | 0 | 0 |

TABLE 11

Match between source and codebook Haddamard Coefficients.

| | CODEBOOK MATCH ERROR | | |
|---|---|---|---|
| | VECTOR 0 | VECTOR 1 | VECTOR 2 |
| $A_2 - (B^2_2/C_2)$ | not evaluated | 7088.92 | 1134.74 |
| $A_3 - (B^2_3/C_3)$ | not evaluated | not evaluated | 1136.17 |
| $A_4 - (B^2_4/C_4)$ | not evaluated | not evaluated | 1140.62 |
| $A_5 - (B^2_5/C_5)$ | not evaluated | not evaluated | 1219.54 |
| $A_6 - (B^2_6/C_6)$ | not evaluated | not evaluated | 1380.37 |
| $A_7 - (B^2_7/C_7)$ | not evaluated | not evaluated | 1577.32 |
| $A_8 - (B^2_8/C_8)$ | not evaluated | not evaluated | 2833.03 |
| $A_9 - (B^2_9/C_9)$ | not evaluated | not evaluated | 2838.34 |
| $A_{10} - (B^2_{10}/C_{10})$ | not evaluated | not evaluated | 2838.55 |
| $A_{11} - (B^2_{11}/C_{11})$ | not evaluated | not evaluated | 2838.55 |
| $A_{12} - (B^2_{12}/C_{12})$ | not evaluated | not evaluated | 2840.68 |
| $A_{13} - (B^2_{13}/C_{13})$ | not evaluated | not evaluated | 2956.36 |
| $A_{14} - (B^2_{14}/C_{14})$ | not evaluated | not evaluated | 3142.72 |
| $A_{15} - (B^2_{15}/C_{15})$ | 3014.45 | not evaluated | not evaluated |

The invention claimed is:

1. A codebook search method comprising the steps of:
   a) providing a plurality of codebook patches;
   b) providing at least one image patch;
   c) transforming by means of a lossless transform the plurality of codebook patches and the at least one image patch into sets of frequency domain codebook coefficients and a set(s) of frequency domain image coefficients, respectively;
   d) for the/each image patch selecting a shortlete (ie. shortlist) of possible match codebook patches by means of a pattern comparison of + and − signs of the image coefficients of the/each image patch with the codebook coefficients; and
   e) undertaking a further comparison of the image patch(es) against the shortlete codebook patches to select a substantially best match, this further comparison being effected by any desired method.

2. A method as claimed in claim 1, wherein the number of image coefficients used in the pattern comparison of step d) is, at least initially, equal in number to the number of pixels in a patch.

3. A method as claimed in claim 2, wherein the number of image coefficients required to make the pattern comparison of step d) is equal in number to those most significant in the frequency spectrum representative of the codebook coefficients.

4. A method as claimed in any preceding claim, wherein the transform of step c) is computed for each of the codebook patches and the codebook coefficients are stored with the codebook patch to which they apply.

5. A method as claimed in any preceding claim, wherein for each codebook patch a 'sign string' is established, comprising a multi-bit pattern in which each bit corresponds to a specific instance of the set of multiple coefficients chosen for examination, each bit in the string being assigned a first binary value if the corresponding coefficient is negative or a second binary value if the corresponding coefficient is positive.

6. A method of compressing an image frame composed of an array of pixels in the form of digital signals, including the step of providing a codebook search method as claimed in any preceding claim.

7. An apparatus for compressing an array of data entries in the form of digital signals, the apparatus comprising a computer apparatus set up to run a program embodying a codebook search method according to any one of claims 1–5.

8. A computer program product carrying a computer program embodied in a computer readable medium adapted to perform the codebook search method according to any one of claims 1–5.

* * * * *

UNITED STATES PATENT AND TRADEMARK OFFICE
CERTIFICATE OF CORRECTION

PATENT NO. : 7,099,517 B2  
APPLICATION NO. : 10/182299  
DATED : August 29, 2006  
INVENTOR(S) : Fryer et al.

Page 1 of 1

It is certified that error appears in the above-identified patent and that said Letters Patent is hereby corrected as shown below:

Column 1,  
Line 9, insert the following paragraph,  
--This invention relates to data compression, and in particular, though not exclusively, to an improved codebook search method, eg. for use in a data compression method. The invention further relates to a method and apparatus for compressing arrays of data in the form of digital signals, and is applicable to the compression of digitally encoded image sequences.--.

Column 18,  
Lines 39, 44, and 55, cancel "any preceding claim" and insert --claim 1--;  
Lines 59-60, cancel "any one of claims 1-5" and insert --claim 1--.

Signed and Sealed this

Twenty-ninth Day of May, 2007

JON W. DUDAS  
*Director of the United States Patent and Trademark Office*